United States Patent [19]

Briccetti et al.

[11] Patent Number: 4,483,388

[45] Date of Patent: Nov. 20, 1984

[54] APPARATUS AND METHOD FOR PROVIDING FAILSAFE SUPPLEMENTAL HEAT REGULATION IN AN AIR CONDITIONING CONTROL

[75] Inventors: Mario F. Briccetti; John D. Manning, both of Liverpool, N.Y.

[73] Assignee: Carrier Corporation, Syracuse, N.Y.

[21] Appl. No.: 362,783

[22] Filed: Mar. 29, 1982

[51] Int. Cl.³ ............... F25B 13/00; F25B 29/00
[52] U.S. Cl. .................................. 165/2; 165/25; 165/29; 237/2 B
[58] Field of Search .............. 165/2, 24, 25, 29, 33; 237/2 R, 2 A, 2 B, ; 236/46 R, 15 PG, 46 F; 62/157, 160, 164, 207

[56] References Cited

U.S. PATENT DOCUMENTS

| | | | |
|---|---|---|---|
| 3,318,372 | 5/1967 | Shell | 165/29 |
| 4,147,203 | 4/1979 | Rayfield | 165/29 |
| 4,158,383 | 6/1979 | Rayfield | 165/29 |
| 4,270,597 | 6/1981 | Denny | 165/29 X |
| 4,311,190 | 1/1982 | Walley | 62/164 |
| 4,335,847 | 6/1982 | Levine | 236/46 R |
| 4,352,452 | 10/1982 | Shimada et al. | 165/24 |

FOREIGN PATENT DOCUMENTS 0117243  10/1978  Japan ............... 62/164

Primary Examiner—William R. Cline
Assistant Examiner—Edward P. Walker
Attorney, Agent, or Firm—David L. Adour

[57] ABSTRACT

Apparatus and a method for providing failsafe supplemental heat operation of an air conditioning control are disclosed. Operating power to a microprocessor control is discontinued when the air conditioning unit is placed in a supplemental heat mode by the user. The microprocessor control is so arranged that appropriate connections are made to operate a supplemental heat source in response to a first stage heating need being sensed by the thermostat when operating power to the microprocessor control is discontinued. Under normal conditions multiple stage heating operation is provided with a supplemental heat source being operated under control of a programmed microprocessor.

3 Claims, 4 Drawing Figures

APPARATUS AND METHOD FOR PROVIDING FAILSAFE SUPPLEMENTAL HEAT REGULATION IN AN AIR CONDITIONING CONTROL

BACKGROUND OF THE INVENTION

1. Field of the Invention

The present invention relates to a control apparatus and method for use in an air conditioning system. More specifically, this invention concerns providing failsafe supplemental heat operation with a microprocessor control for an air conditioning system.

2. Description of the Prior Art

Various sources of heat energy may be utilized to provide space conditioning. Fossil fuel fired furnaces, electric resistance heat and reversible refrigeration circuits are all well known for utilization for space heating. In a typical system a thermostat is provided to sense the temperature of the space to be conditioned and means are provided for energizing the heat source in response to the temperature detected.

In many reversible refrigeration circuit or heat pump systems multiple heat sources are utilized. In a typical system a heat pump may be utilized under certain conditions to supply heat energy to the space and under other conditions backup or supplemental heating means may be utilized for supplying heating to the space. The backup supplemental heating in these conditions may be electric resistance heat connected to supply heat energy in combination with the heat pump or in addition thereto. Other types of supplemental heat may include a fossil fuel fired furnace which would be operated and the heat pump operation discontinued such that the separate heat sources would not operate simultaneously.

It has also been known in the air conditioning field that heat pumps may fail or may operate inefficiently due to some cause. In such event the operator may wish to continue heating of the space without operation of the heat pump. Under such conditions it has been known to utilize a supplemental heat switch for placing the system in supplemental heating operation. Typically, supplemental heat operation has been the energization of backup electric resistance heat associated with the heat pump.

The present invention concerns the utilization of a microprocessor control in combination with a space conditioning system. Power is supplied to the control through the thermostat. The thermostat is arranged such that, should a supplemental heating need be ascertained, operation of the heating system in the supplemental heating mode may be accomplished by throwing a manual switch on the thermostat which acts to discontinue power to the microprocessor control. The present invention provides for the microprocessor being arranged such that should operating power to the microprocessor be discontinued then, in that event, the appropriate connections will be made through the microprocessor control to energize the supplemental heat in response to a first stage heating need being detected by the thermostat.

SUMMARY OF THE INVENTION

It is an object of the present invention to provide a control method for an air conditioning system.

A more specific object of the present invention is to provide a method and apparatus for controlling an air conditioning system incorporating a microprocessor control.

It is a further object of the present invention to provide a supplemental heat control arrangement incorporating a microprocessor control for allowing supplemental heat operation when power to the microprocessor control is discontinued.

It is a further object of the present invention to provide a safe, economical and reliable means for controlling operation of supplemental heat in an air conditioning system when a microprocessor control is not being powered.

These and other objects of the present invention are achieved by providing a method of operating an air conditioning system in a heating mode including the steps of detecting a heating need of the space to be conditioned and generating a signal in response to the detected need, conditioning the signal from the step of detecting to generate a resultant signal for effecting control of the system, energizing the heating means in response to the resultant signal generated by the step of conditioning, discontinuing the step of conditioning when it is desired to operate the system in an emergency mode of operation and connecting the signal generated by the step of detecting to the step of energizing when the step of discontinuing the step of conditioning is desired. The step of conditioning the signal includes utilizing a programmed microprocessor to generate a resultant signal and the step of discontinuing the step of conditioning includes de-energizing the microprocessor.

The air conditioning system for supplying heat energy may include a thermostat for sensing a need for heating and generating a signal in response to the sensed need, heat generation means connected to an energy source for generating heat energy, and a control electrically connected to the thermostat and the heat generation means for appropriately regulating the heat generation means in response to the signal received from the thermostat. Said control receives operating power separately from said signal and said thermostat further including a supplemental heat switch arranged to direct power to a first terminal of the control and discontinuing operating power to said control. The control is arranged such that electrical connections are made between the first terminal of the control and the connection of the control to the heat generation means when operating power to the control is discontinued whereby upon a supplemental heat switch being closed the heat generation means may be energized when operating power to the control has been discontinued.

DESCRIPTION OF THE PREFERRED EMBODIMENT

The apparatus and method as described herein will refer to a heat pump system for use in a residential building incorporating a microprocessor control. The apparatus will further include supplemental electric resistance heat as backup or as additional heat to the heat pump system. It is to be understood that although the present control incorporates a microprocessor control the same functions could be achieved through mechanical or electromechanical means. The utilization of the microprocessor control herein serves many functions in addition to the functions as described. It is further to be understood that although the present disclosure refers to a heat pump system such a control would be equally useful with a fossil fuel fired system, electric resistance heat or other heating means. In addition, such a control would also find applicability to a heat pump system having supplemental heat other than electric resistance heat.

Figure 1:
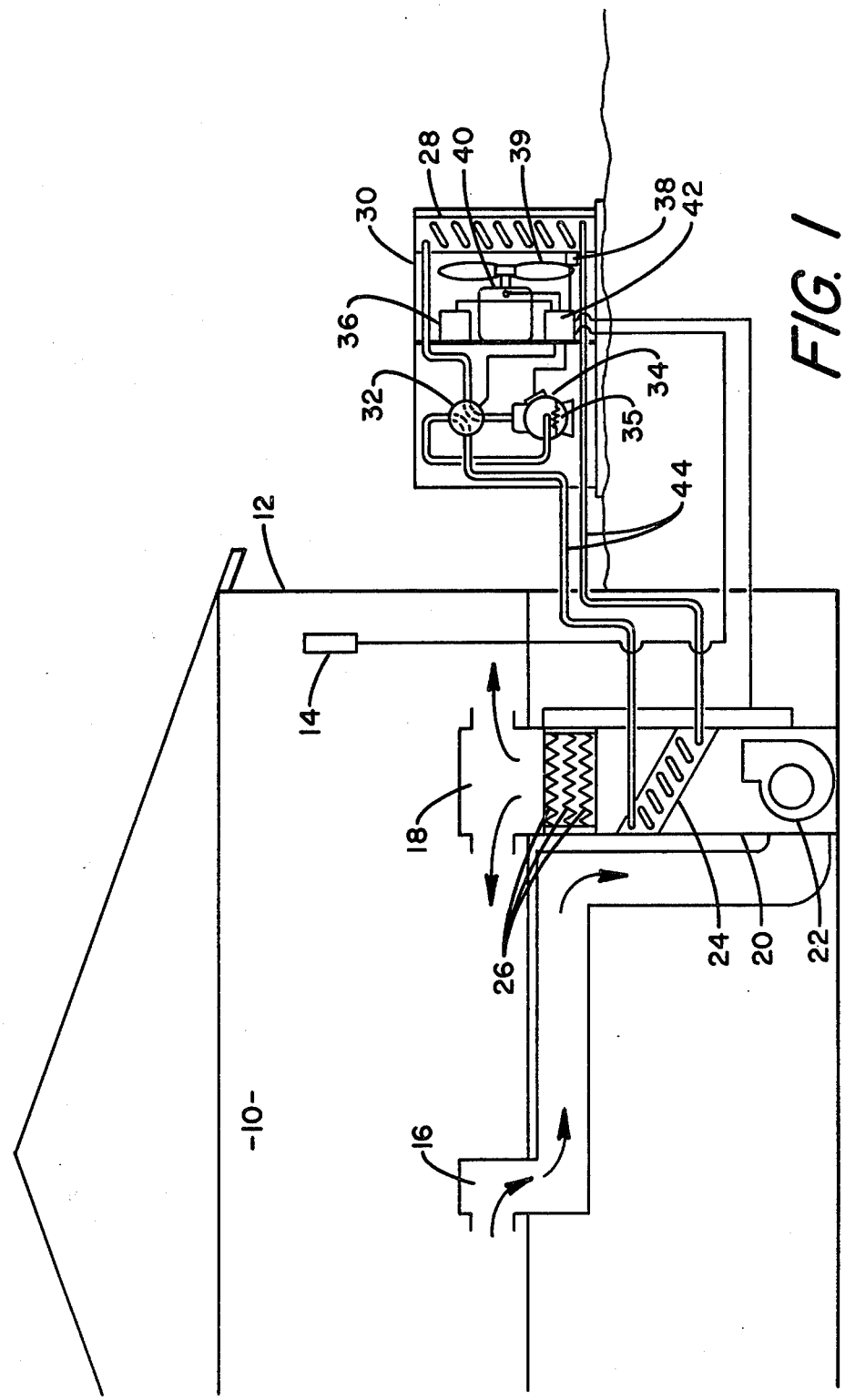
FIG. 1 is a schematic representation of a split heat pump system incorporated into a residential building.

Referring first to FIG. 1 there can be seen a schematic representation of a heat pump system. Residence 10 is shown having fan coil unit 20 located therein for circulating conditioned air within the house. Supply air duct 16 is shown directing air from the enclosure to fan coil unit 20 and return air duct 18 is shown for directing air from the fan coil unit back to the enclosure. Within the fan coil unit 20 may be seen indoor fan 22, indoor heat exchanger 24 and strip heaters 26. Indoor fan 22 acts to circulate the air through the supply duct, through the indoor heat exchanger and strip heaters and back through the return air duct to the enclosure. Indoor heat exchanger 24 is part of a refrigeration circuit and acts to either discharge heat to the air stream directed thereover via indoor fan 22 or to absorb heat energy therefrom. Strip heaters 26 are located downstream from indoor heat exchanger 24 and may be selectively energized to supply heat energy to the air stream flowing through the fan coil unit.

Outdoor unit 30 is shown located exterior of residence 10 and is typically mounted on a pad located adjacent thereto. Within outdoor unit 30 may be seen outdoor coil 28 of the refrigeration circuit, compressor 34 and reversing valve 32. Additionally, there can be seen outdoor fan 39 connected to outdoor fan motor 40 for circulating ambient air over outdoor coil 28. Outdoor temperature sensor 36, outdoor coil temperature sensor 38, crankcase heater 35 and control 42 are also indicated to be within the outdoor unit. Likewise, thermostat 14 as well as electrical connections to strip heaters and the indoor fan motor for powering indoor fan 22 are designated.

The refrigeration circuit is made up of indoor coil 24, outdoor coil 28, compressor 34, reversing valve 32 and interconnecting piping 44. Expansion devices for accomplishing pressure drops between components of the refrigeration circuit are not shown.

During operation of this unit in the heating season, heat energy is absorbed in the outdoor coil 28 acting as an evaporator and discharged to indoor air via indoor heat exchanger 24 serving as a condenser. In the cooling mode of operation the reversing valve is switched such that hot gaseous refrigerant from the compressor is directed first to the outdoor coil 28 serving as a condenser and then directed to the indoor coil 24 serving as an evaporator for absorbing heat energy from the indoor air.

Figure 2:
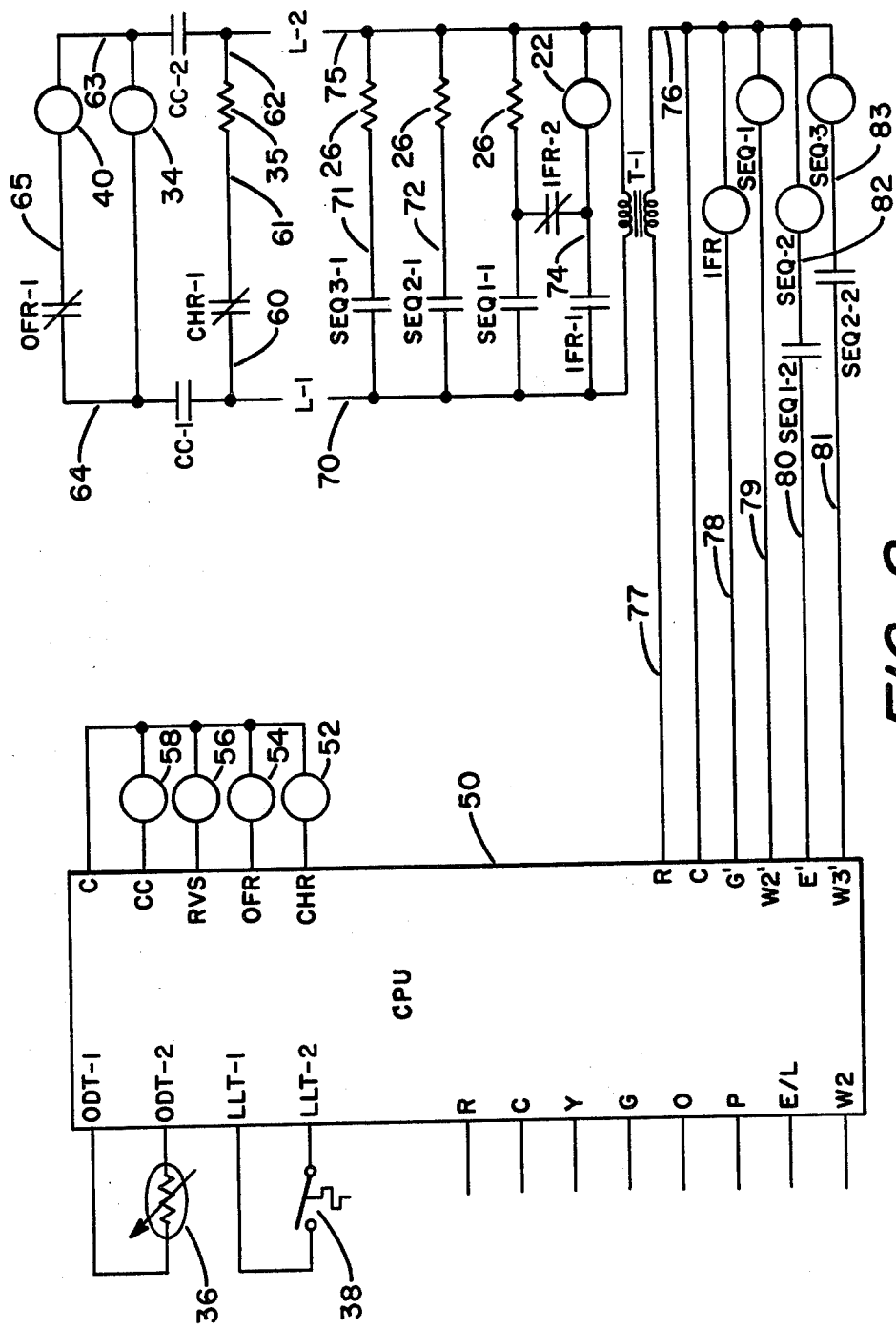
FIG. 2 is a schematic wiring diagram of the controls of the heat pump system.

Referring now to FIG. 2, there can be seen a schematic representation of the control system of this unit. In the left hand portion of FIG. 2 is shown, greatly enlarged, a central processing unit 50. Typically, this would be a commercially available microprocessor such as a Mostek 3870. It can be seen that the microprocessor has a plurality of inputs and outputs. Starting from the top left it can be seen that outdoor air temperature sensor 36 is connected through ODT-1 and ODT-2 to the central processing unit.

Additionally, outdoor coil temperature sensor 38 is shown connected to the CPU through LLT-1 and LLT-2. Thereafter, a series of eight thermostat inputs labeled R, C, Y, G, 0, P, E/L and W-2 are shown entering the central processor unit. In sequential order, these thermostat inputs are as follows: R - Power to the thermostat from the CPU; C - Common; Y - First stage heating; G - Energize indoor fan relay; O - First stage cooling (reversing valve); P - operating Power to the central processing unit from the thermostat; E/L - Emergency heat or fault light; W-2 - Second stage heat. The "operating power" provided through input P to the central processing unit from the thermostat is necessary for the central processing unit to operate to provide its signal conditioning and signal generating functions while the "power" provided through the input R to the thermostat from the central processing unit is a source of power for energizing various relays which are part of the control system.

On the right hand side of the central processing unit there may be seen connections to various relays. Crankcase heater relay 52, outdoor fan relay 54, reversing valve solenoid relay 56 and compressor contactor 58 are all shown connected to the appropriate compressor, reversing valve solenoid, outdoor fan relay, and crankcase heater relay connections of CPU 50. The CPU is programmed such that upon an appropriate set of inputs being sensed these relays will be energized.

At the bottom right hand side of the central processing unit 50 there are shown six connection points labeled respectively R, C, G', W-2', E' and W-3'. In order, these connections are R - Power, C - Common, G' - Indoor fan relay, W-2' - First stage heat, E' - Second stage heat and W-3' - Third stage heat. As can be seen in FIG. 2, the R connection is connected via wire 77 to one side of transformer T-1. The C connection is connected via wire 76 to the other side of transformer T-1. G' is connected via wire 78 to indoor fan relay IFR. Wire 79 connects W-2' to sequence relay SEQ-1. The E' terminal is connected via wire 80 to first sequence relay contacts SEQ1-2 which are connected by wire 82 to second sequence relay SEQ-2. Contact W-3' is connected via wire 81 to second sequence relay contacts SEQ2-2 which are connected by wire 83 to third sequence relay SEQ-3. The R power output to the thermostat from the CPU on the left hand side of the CPU and the R power input on the right hand side of the CPU from transformer T-1 may be a single terminal point or there may be a direct connection therebetween such that power continuously flows between the two connection points labeled R in the central processing unit.

As shown in FIG. 2, lines L-1 and L-2 supply power to the fan coil unit and CPU. Line L-1, designated wire 70, is connected to normally open first sequence relay contacts SEQ1-1, normally open second sequence relay contacts SEQ2-1, to normally open third sequence relay contacts SEQ3-1, to normally open indoor fan relay contacts IFR-1 and to transformer T-1. Line L-2, designated as 75, is connected to heaters H1, H2 and H3, all designated as 26, to transformer T-1 and to indoor fan motor 22. Wire 71 connects normally open third sequence relay contacts SEQ3-1 to heater H3. Wire 72 connects normally open second sequence relay contacts SEQ2-1 to heater H2. Wire 73 connects normally open first sequence relay contacts SEQ1-1 to heater H1 and to normally closed indoor fan relay contacts IFR-2. Wire 74 connects normally open indoor fan relay contacts IFR-1 and normally closed indoor fan relay contacts IFR-2 to indoor fan motor 22.

Power wiring of the outdoor unit may be seen in the top portion of FIG. 2. Therein connected between power lines L-1 and L-2 is wire 60 connected to normally open compressor contactor contacts CC-1 and to normally closed crankcase heater relay contacts CHR-1. Wire 61 connects normally closed crankcase heater relay contacts CHR-1 with crankcase heater CCH (35). Crankcase heater 35 is connected via wire 62 to line L-2 and to normally open compressor contactor contacts CC-2. Wire 64 connects normally open compressor contactor contacts CC-1 to normally closed outdoor fan relay contacts OFR-1 and to compressor motor 34. Wire 65 connects normally closed outdoor fan relay contacts OFR-1 to outdoor fan motor 40. Normally open compressor contactor contacts CC-2 are connected via wire 63 to compressor motor 34 and to outdoor fan motor 40.

Figure 3:
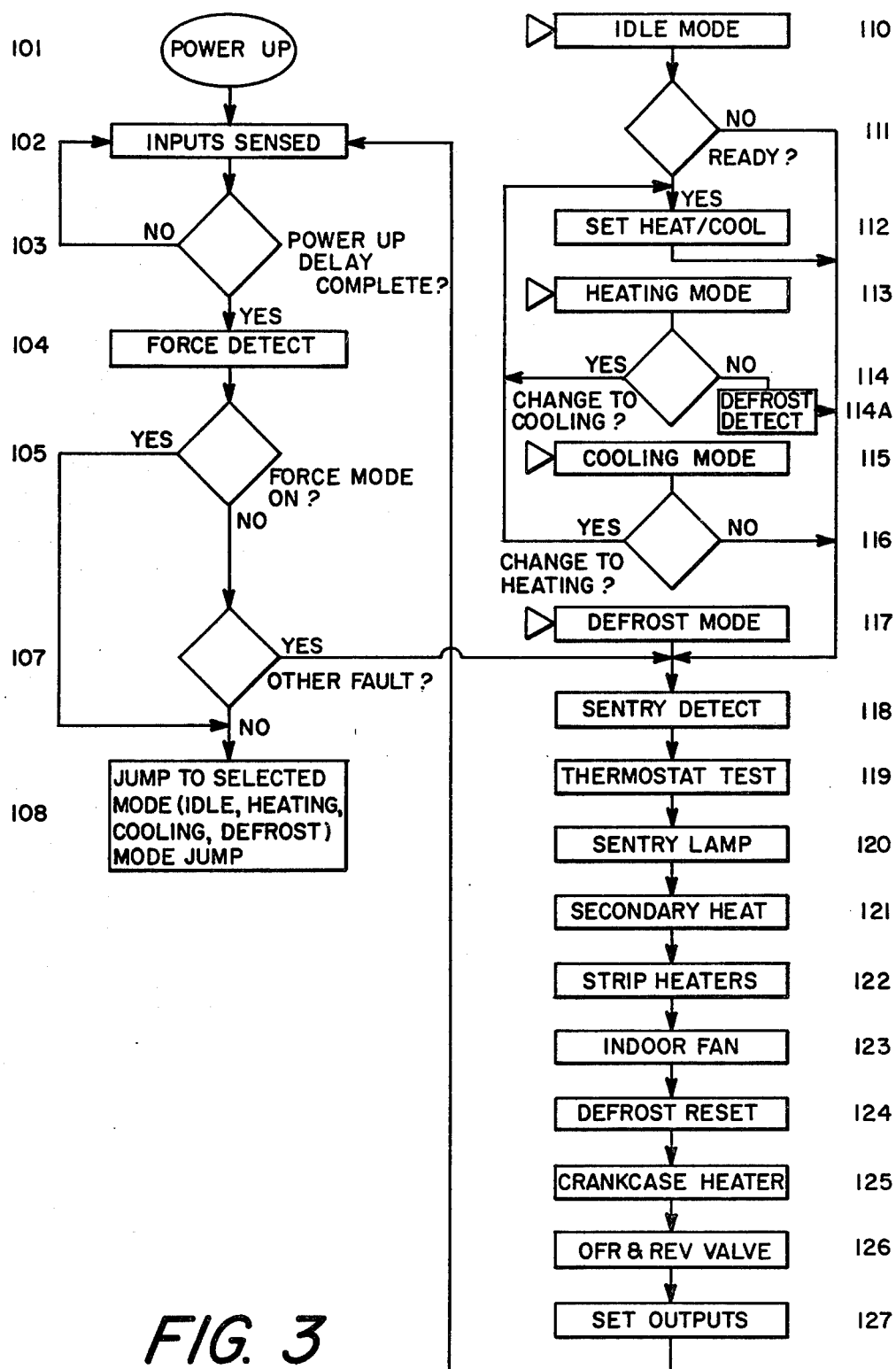
FIG. 3 is a flow diagram of the summary of the operation of a microprocessor control for the heat pump system.

FIG. 3 is a flow chart indicating the overall operation of the control system. It can be seen that the overall system control is obtained by logic flow through a series of logic steps. Each logic step may represent a subroutine or series of steps omitted for clarity in this overall chart. The initial step 101 is the powerup of the unit upon energization. Thereafter at step 102 the various inputs are sensed. To make sure the inputs are stabilized and debounced a powerup delay occurs before proceeding to force detect step 104. If the powerup delay is not complete then there is a reversion to the step of sensing inputs until said delay is accomplished. Force detect, step 104, determines whether or not the compressor is operating when it is not supposed to be. This step would detect a condition such as a contactor welded closed energizing the compressor when the various inputs are calling for the compressor to be de-energized. Step 105 determines whether the force mode is detected. If the force mode is detected then the program skips to step 108 wherein the logic jumps to the selected mode. If, in step 105, the force mode is not detected then the logic proceeds to step 107. At step 107 there is a determination whether there is another fault in the system. If there is no other fault the logic proceeds to step 108, the jump to the selected mode, one of the modes of idle, heating, cooling or defrost. If another fault is detected then the control logic jumps to step 118, sentry detect.

If in step 108 the jump is selected to the idle mode then the logic proceeds to step 110. Thereafter, at step 111, a ready determination is made and if the answer is no the logic jumps to step 118 without placing the unit in heating or cooling. If the answer to step 111 is yes the logic proceeds to step 112 and the air conditioning unit is placed in heating or cooling in step 112. The logic then jumps to step 118.

If the jump to the selected mode selects the heating mode then the jump is made to step 113. Once operation is in the heating mode the question of should operation be changed to cooling is continually answered at step 114. If the answer is yes, the logic is cycled back to step 112 of setting the unit in heat or cool and if the answer is no logic operation proceeds to step 114A, defrost detect. If a need for defrost is detected the logic changes the mode from heating to defrost and then jumps to step 118. If a need for defrost is not detected the logic does not change the mode and then jumps to step 118.

If in step 108 the selection is the cooling mode then the logic proceeds to step 115. Step 116 continually questions if operation should be changed to heating. If the answer is yes the control sequence proceeds back to the step 112 of setting the unit for heating or cooling. If the answer is no the logic jumps to step 118.

The fourth mode jump is to the defrost mode, step 117. This step in the logic either continues or cancels the defrost mode of operation. If the jump is made to the defrost mode, thereafter the logic proceeds through the entire control sequence. From the defrost mode the control sequence includes the steps of sentry detect 118, thermostat test 119, sentry lamp 120, secondary heat 121, strip heaters 122, indoor fan 123, defrost reset 124, crankcase heater 125, OFR plus REV valve 126 and set outputs 127. From the step of set outputs 127 the control sequence reverts to step of inputs sensed (102).

The sentry detect step acts to check the compressor for low current or for ground fault indication. The thermostat test checks to make sure the inputs from the thermostat are in a legal pattern. The sentry lamp step acts to blink a thermostat lamp to indicate various fault modes. Secondary heat controls the W-2' output from the central process unit. The step of strip heaters 122 control the E' and W-3' outputs from the central processing unit. Indoor fan step 123 controls indoor fan 22. Defrost reset determines when a defrost timer for controlling the length of defrost needs to be reinitialized. Crankcase heater, step 125, acts to control the crankcase heater operation. OFR plus REV valve, step 126, acts to control the outdoor fan relay and the reversing valve relays under the appropriate conditions. Step 127 for setting the outputs turns on and off the central processing unit outputs and detects when the compressor is changing state.

Figure 4:
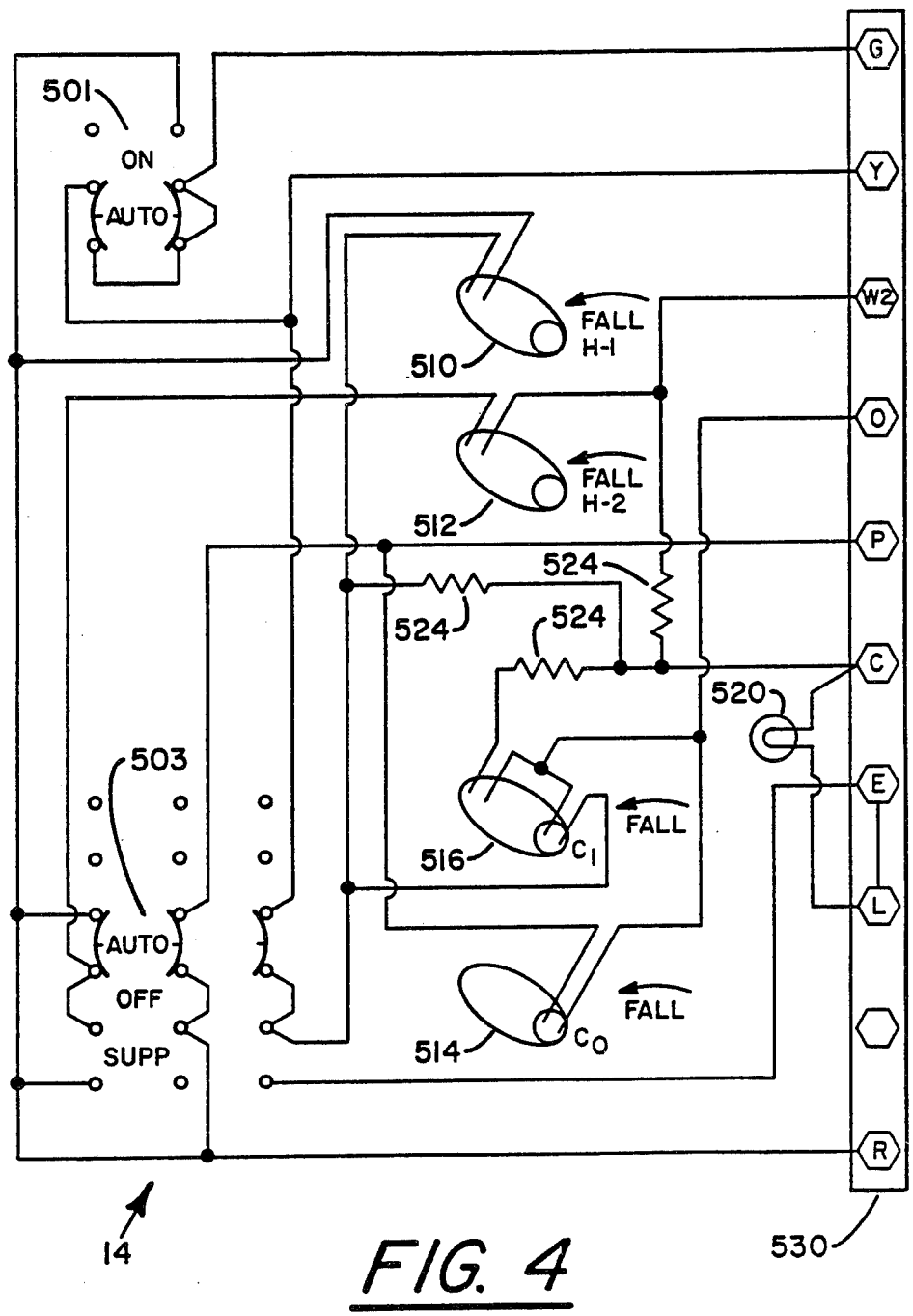
FIG. 4 is a wiring schematic of a thermostat suitable for use in the disclosed system.

FIG. 4 discloses a typical thermostat as might be utilized with the herein invention. Thermostat 14 is shown having fan switch 501 having on and automatic positions. System switch 503 is shown in automatic, off and supplemental heat positions. Four thermal sensing elements are shown including a first stage heating bulb 510 and second stage heating bulb 512 referenced respectively as H-1 and H-2 for indicating the staged heating requirements. First stage cooling bulb 514 and second stage cooling bulb 516 also designated as $C_0$ and $C_1$ respectively are shown for indicating successive steps in cooling. Additionally, terminal strip 530 is shown having appropriate terminal connections G, Y, W-2, O, P, C, E, L, and R. These terminals of terminal strip 530 are connected via control wiring to the central processing unit as shown in FIG. 2. The terminals with corresponding letter designations of terminal strip 530 are wired to the terminals with the appropriate designated letter of the central processing unit.

During operation power is supplied from terminal R to the system switch 503 and to fan switch 501. If fan switch 501 is in the on position, power as supplied through terminal R is connected to terminal G for operating the fan. If the fan is in the automatic position the fan terminal G is only powered when other connections are made. Power from terminal R is supplied through system switch 503 to terminal P which acts to provide operating power to the central processing unit. Power is also supplied through the system switch in the automatic position to first stage cooling bulb 514 and to first stage heating bulb 510. Upon first stage heating bulb 510 sensing a need for heating the bulb rotates and contact is made such that power from terminal R is then connected through first stage heating bulb 510 to fan switch 501 for energizing the fan and to terminal Y for energizing the compressor. At this point power is also supplied through system switch 503 to second stage heating bulb 512. When second stage heating bulb 512 closes power is supplied to terminal W-2 in addition to terminal Y.

Should a cooling need be sensed then power is supplied from terminal R through system switch 503 to first stage cooling bulb 514. Should the first stage cooling bulb be in a position to make contact power is then supplied to terminal 0 which is connected to energize the reversing valve to place the reversing valve in the cooling position. Upon a further rise in temperature bulb $C_1$ closes supplying power to the Y terminal, said power being received through the first stage cooling bulb 514.

Terminal C is a common terminal to the power supply system. Terminal E is energized through system switch 503 and bulb 510 when the system switch is placed in the supplemental heating position. Terminal L is jumpered to terminal E and has light 520 connected between terminal L and C such that upon the application of power therethrough the light may be blinked. Upon the present apparatus detecting a fault in the wiring of the thermostat this light may be blinked to indicate to the homeowner that there is a wiring problem.

It may be seen that when the operator desires supplemental heat operation the system switch 503 is moved downwardly such that the connections are made between terminal R and heating bulb 510. Should heating bulb 510 close detecting a heating need power is then supplied to terminal E through a portion of the system switch 503. Hence, first stage heating bulb 510 acts to energize terminal E through the system switch which may be utilized for initiating the operation of supplemental heating means.

Under normal operating conditions with system switch 503 set in the automatic position power is supplied from terminal R through the system switch 503 to terminal P for supplying operating power to the microprocessor control. When the system switch 503 is placed in the supplemental heat position the connection of terminal R to terminal P is discontinued and operating power is not supplied to the microprocessor.

It can be seen from the above description that when operation of the unit is placed in the supplemental heat position the operating power to the microprocessor is discontinued and operation of the supplemental heating means is based upon a heating need being detected by first stage heating bulb 510 of thermostat 14. The microprocessor control is internally arranged such that upon a failure of operating power to the microprocessor control the conditioning of signals and the generation of an appropriate response therethrough is discontinued. When operating power to the microprocessor control through terminal P is discontinued the receipt of a signal from terminal E is directed to the W-2', E' and W-3' output terminals of the microprocessor control. From the W-2', E' and W-3' terminals of the microprocessor the supplemental heating means is energized. Through the normal sequence of operation (i.e., the sequential energization of the SEQ-1, SEQ-2, and SEQ-3 relays) the multiple electrical resistance heaters are energized as a result of the W-2', E' and W-3' terminals being energized. When the microprocessor is not receiving operating power and W-2', E' and W-3' are all connected to receive a signal from the thermostat directly, the microprocessor is not operating on a backup program. In this mode of operation, the microprocessor is arranged to allow a signal to simply be routed between the various terminal points. The input to terminal E is only a signal input and does not provide operating power to the microprocessor.

The herein invention has been described with reference to a specific embodiment. It is to be understood by those skilled in the art that variations and modifications can be effected within the spirit and scope of the invention.

What is claimed is:

1. An air conditioning system for supplying heat energy to a space for maintaining a space temperature which comprises:
    a thermostat for sensing a need for heating and for generating a signal in response to the sensed need, said thermostat including a first stage temperature sensor and a second stage temperature sensor;
    a heat generation means connected to an energy source for generating heat energy, said heat generation means including a first heating means and a supplemental heating means;
    a control electrically connected to the thermostat and the heat generation means for appropriately regulating the heat generation means in response to the signal received from the thermostat, said control receiving operating power separately from said signal;
    said thermostat further including a supplemental heat switch arranged with the first stage temperature sensor being connected to energize the first heating means through the control and the second stage temperature sensor being connected to energize the supplemental heating means through the control when the supplemental heat switch is not in a closed position and the thermostat senses a need for heating, and the first stage temperature sensor being connected to energize the supplemental heating means through the control when the supplemental heat switch is in the closed position; and
    wherein said control is arranged such that an electrical connection is made between the control and the heat generation means when operating power to the control is discontinued whereby upon the supplemental heat switch being closed the supplemental heating means may be energized with operating power to the control being discontinued.

2. An air conditioning system for supplying heat energy to a space for maintaining a space temperature which comprises:
    a thermostat for sensing a need for heating and for generating a signal in response to the sensed need;
    a heat generation means connected to an energy source for generating heat energy;
    a microcomputer electrically connected to the thermostat and the heat generation means for appropriately regulating the heat generation means in response to the signal received from the thermostat, said microcomputer receiving operating power through the thermostat;
    said thermostat further including a supplemental heat switch arranged to direct power to a first terminal of the microcomputer when said switch is closed and the thermostat senses a need for heating, and said thermostat further including the power source for the operating power of the microprocessor control and wherein the supplemental heat switch when in the closed position interrupts the supply of operating power to the microprocessor control; and wherein said microcomputer electrically connects the first terminal of the microcomputer to the heat generation means when operating power to the microcomputer is interrupted whereby upon the supplemental heat switch being closed the heat generation means may be energized with operating power to the microcomputer being discontinued.

3. A method of operating an air conditioning system in a heating mode which comprises the steps of:

detecting a first stage heating need and a second stage heating need of a space to be conditioned and generating a signal in response to the detected need;

conditioning the signal from the step of detecting by directing the signal through a programmed microprocessor control for generating a resultant signal for effecting control of the system;

energizing a primary heating means and a supplemental heating means in response to the resultant signal from the step of conditioning;

supplying operating power to the microprocessor control;

discontinuing supplying operating power to the microprocessor control when it is desired to operate the system in a supplemental heating mode of operation; and connecting the signal generated by the step of detecting to the step of energizing with the microprocessor control being arranged such that the supplement heating means may be energized through the microprocessor control in response to a first stage heating need when operating power to the microprocessor has been discontinued.

* * * * *